United States Patent
Yu

(10) Patent No.: US 6,883,338 B2
(45) Date of Patent: Apr. 26, 2005

(54) POWER-OFF STATE DISPLAY APPARATUS OF REFRIGERATOR AND METHOD THEREOF

(75) Inventor: Dong-Kug Yu, Gyeongsangnam-Do (KR)

(73) Assignee: LG Electronics Inc., Seoul (KR)

( * ) Notice: Subject to any disclaimer, the term of this patent is extended or adjusted under 35 U.S.C. 154(b) by 45 days.

(21) Appl. No.: 10/139,507

(22) Filed: May 7, 2002

(65) Prior Publication Data

US 2002/0166329 A1 Nov. 14, 2002

(30) Foreign Application Priority Data

May 8, 2001 (KR) ........................................ 2001-24920

(51) Int. Cl.[7] .............................................. F25B 49/00
(52) U.S. Cl. .......................................... 62/127; 62/441
(58) Field of Search .......................... 62/125, 126, 127, 62/129, 130, 131, 230, 441, 442; 236/94; 165/11.1

(56) References Cited

U.S. PATENT DOCUMENTS

| | | | | |
|---|---|---|---|---|
| 4,364,234 A | * | 12/1982 | Reed | ............................. 62/3.3 |
| 5,490,556 A | * | 2/1996 | Pichotta | ...................... 165/255 |
| 5,782,098 A | * | 7/1998 | Hirooka et al. | ................ 62/126 |
| 5,815,086 A | * | 9/1998 | Ivie et al. | .............. 340/825.52 |
| 6,063,420 A | * | 5/2000 | Chun et al. | .................. 426/231 |
| 6,297,746 B1 | * | 10/2001 | Nakazawa et al. | ..... 340/825.69 |

* cited by examiner

Primary Examiner—Harry B. Tanner
(74) Attorney, Agent, or Firm—Fleshner & Kim, LLP

(57) ABSTRACT

An apparatus and a method is provided for displaying a power-off state of a refrigerator having plural chambers. When a user turns off at least one of the plurality of chambers of the refrigerator, a power-off state display apparatus of the refrigerator displays "OFF" characters on a display unit, thus confirming that a particular chamber has been turned off. The power-off state display apparatus includes a signal generating unit for generating a power-off signal when a user turns off at least one of the plurality of chambers, and a display unit for displaying the power-off state after receiving the power-off signal.

21 Claims, 5 Drawing Sheets

POWER-OFF STATE DISPLAY APPARATUS OF REFRIGERATOR AND METHOD THEREOF

BACKGROUND OF THE INVENTION

1. Field of the Invention

The present invention relates to a refrigerator, and in particular to an apparatus and a method for displaying a power state of a refrigerator having plural chambers.

2. Description of the Prior Art

FIG. 1 illustrates a display unit of a kimchi refrigerator in accordance with the conventional art.

As depicted in FIG. 1, a kimchi refrigerator in accordance with the conventional art includes a left chamber 1 and a right chamber 3. Herein, a display unit 5, which consists of light emitting diodes, of function setting units 2,4 of the kimchi refrigerator is respectively installed at the front surface of the left chamber 1 and the right chamber 3 to display various information. Hereinafter, the operation of the conventional display unit 5 of the kimchi refrigerator will be described in more detail.

First, when early power is applied, each display unit 5 of the kimchi refrigerator displays a fermentation time of kimchi contained in the left chamber 1 and the right chamber 3. In more detail, the rest of the fermentation time until the kimchi contained in the both chambers 1, 3 are fermented is displayed respectively.

Herein, a user can freely set functions of the left chamber 1 and the right chamber 3 according to the kind and taste, etc. of foodstuff to be contained. When the user chooses a kimchi fermentation function, a kimchi fermentation time preset in an internal microcomputer (not shown) is displayed on the display unit (light emitting diodes) 5 installed at the front surface of a pertinent chamber.

In addition, when the user does not use one of the left chamber 1 and the right chamber 3, the user can turn off power of the left 1 or the right chamber 3 by pushing a power-on/off button 6 of a pertinent chamber. Herein, all light diodes of the display unit 5 installed at the front surface of the pertinent chamber are off. In more detail, by turning off all the light diodes, the user can recognize the pertinent chamber is not used. However, light diodes can be off due to a failure of the light diodes themselves or refrigerator, herein, the user only can recognize a pertinent chamber is not used. In other words, the user can not distinguish them (; the power-off according to the user's operation or due to failure).

In the meantime, as depicted in FIG. 1, there are various kinds of kimchi such as watery plain kimchi, radish kimchi and cabbage kimchi, etc.

Herein, U.S. Pat. No. 6,063,420 filed on May 16, 2000 relates to an operation control method of a kimchi refrigerator.

Hereinafter, the conventional power-off method of the kimchi refrigerator will be described with reference to accompanying FIG. 2.

FIG. 2 is a flow chart illustrating the conventional power-off method of the kimchi refrigerator.

First, it is judged whether the user turns off power of at least one of a first~a N chamber respectively performable independent control. In more detail, it is judged whether or not the user pushes the power-on/off button 6 installed at the front surface of the chamber 1.

After that, when the user pushes the power-on/off button 6 in order to cut off power of the chamber 1, a power-off signal is inputted as shown at step S1, power of the display unit (light diodes) 5 installed at the front surface of the chamber 1 is off as shown at step S2.

As described above, in the conventional power-off display method of the kimchi refrigerator, although light diodes are off not because of turning them off but a failure of the light diodes themselves or refrigerator, the user only recognizes it as a pertinent chamber is in an off state. In other words, the user can not distinguish them.

SUMMARY OF THE INVENTION

Accordingly, it is an object of the present invention to provide an apparatus and a method for displaying a power-off state of a refrigerator having plural chambers when a user turns off at least one of plural chambers installed to the refrigerator.

In order to achieve the above-mentioned object, a power-off state display apparatus of a refrigerator in accordance with the present invention includes a signal generating unit for generating a power-off signal when a user turns off at least one of plural chambers installed to a refrigerator; and a display unit for displaying a power-off state by receiving the power-off signal.

In order to achieve the above-mentioned object, a power-off state display method of a refrigerator in accordance with the present invention includes generating a power-off signal to display a power-off state of a pertinent chamber when power of at least one of plural chambers installed to a refrigerator is off; and displaying the power-off state through a display unit after receiving the power-off signal.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Hereinafter, when a user cuts off power of a certain chamber of plural chambers, a power-off state display apparatus of a refrigerator and a method thereof which are capable of displaying a power-off state of a pertinent chamber will be described in detail with reference to accompanying FIGS. 3~5.

Figure 3:
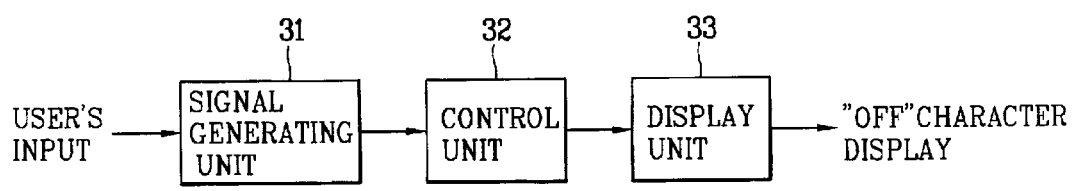
FIG. 3 is a block diagram illustrating a power-off state display apparatus of a kimchi refrigerator in accordance with the present invention.

FIG. 3 is a block diagram illustrating a power-off state display apparatus of a kimchi refrigerator in accordance with the present invention.

As depicted in FIG. 3, the power-off state display apparatus includes a signal generating unit 31 generating a power-off signal (character signal) when a user turns off power of a first chamber of plural (a first~a N) chambers installed to a refrigerator; a control unit 32 outputting the power-off signal or a control signal for displaying a preset kimchi fermentation time; and a display unit 33 displaying a power-off state by receiving the power-off signal or displaying the preset kimchi fermentation time by receiving the control signal. Herein, when the power-off signal is inputted, the control unit 32 outputs only the inputted power-off signal to the display unit 33. In addition, when the power-off signal is not inputted, the control unit 32 outputs only the control signal to the display unit 33. Herein, each of the first~the N chambers is independently controlled.

Hereinafter, the operation of the power-off state display apparatus of the kimchi refrigerator in accordance with the present invention will be described in detail with reference to accompanying FIG. 4.

Figure 4:
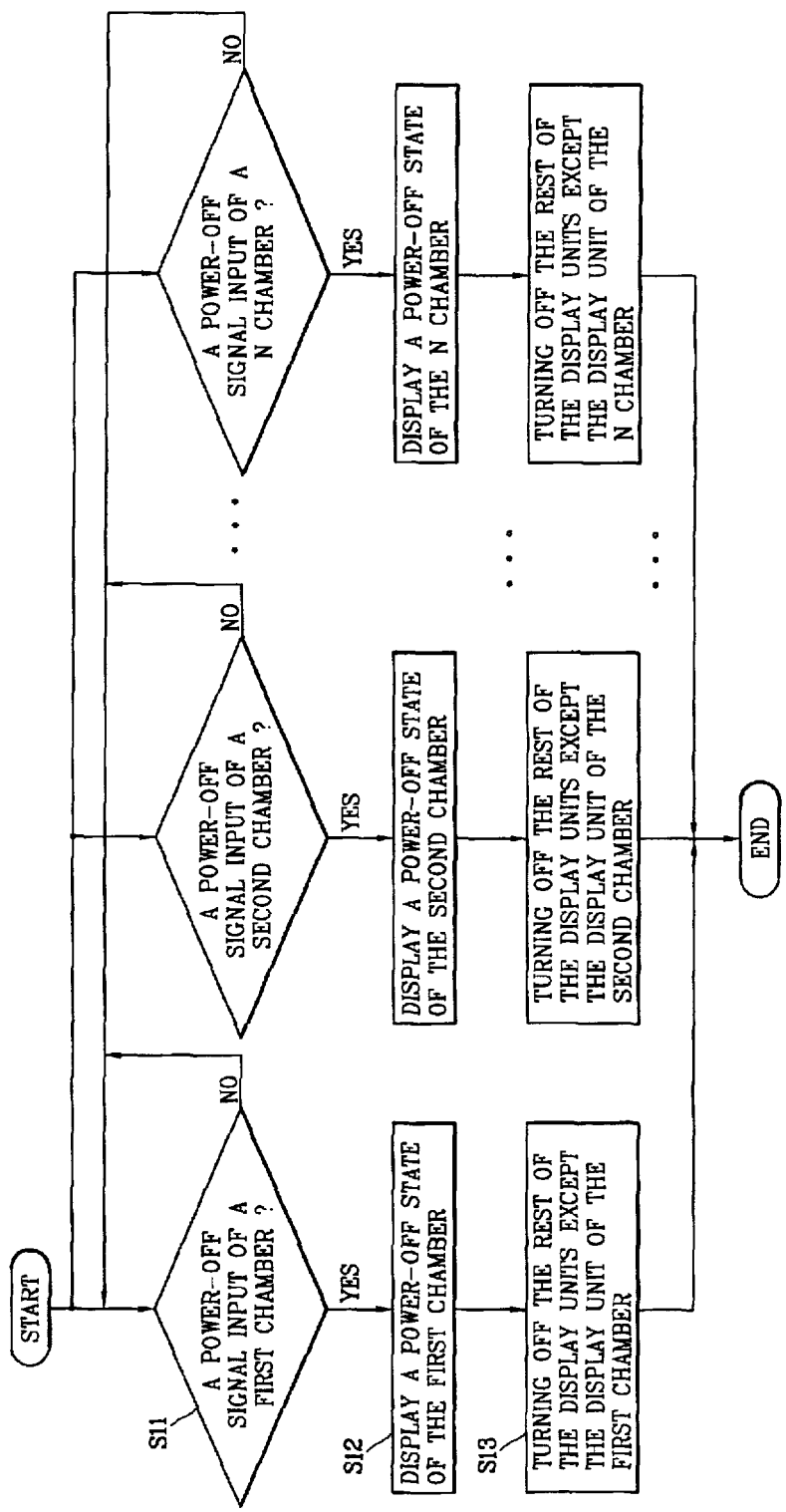
FIG. 4 is a flow chart illustrating a power-off state display method of a kimchi refrigerator in accordance with the present invention.

FIG. 4 is a flow chart illustrating a power-off state display method of a kimchi refrigerator in accordance with the present invention.

Figure 1:
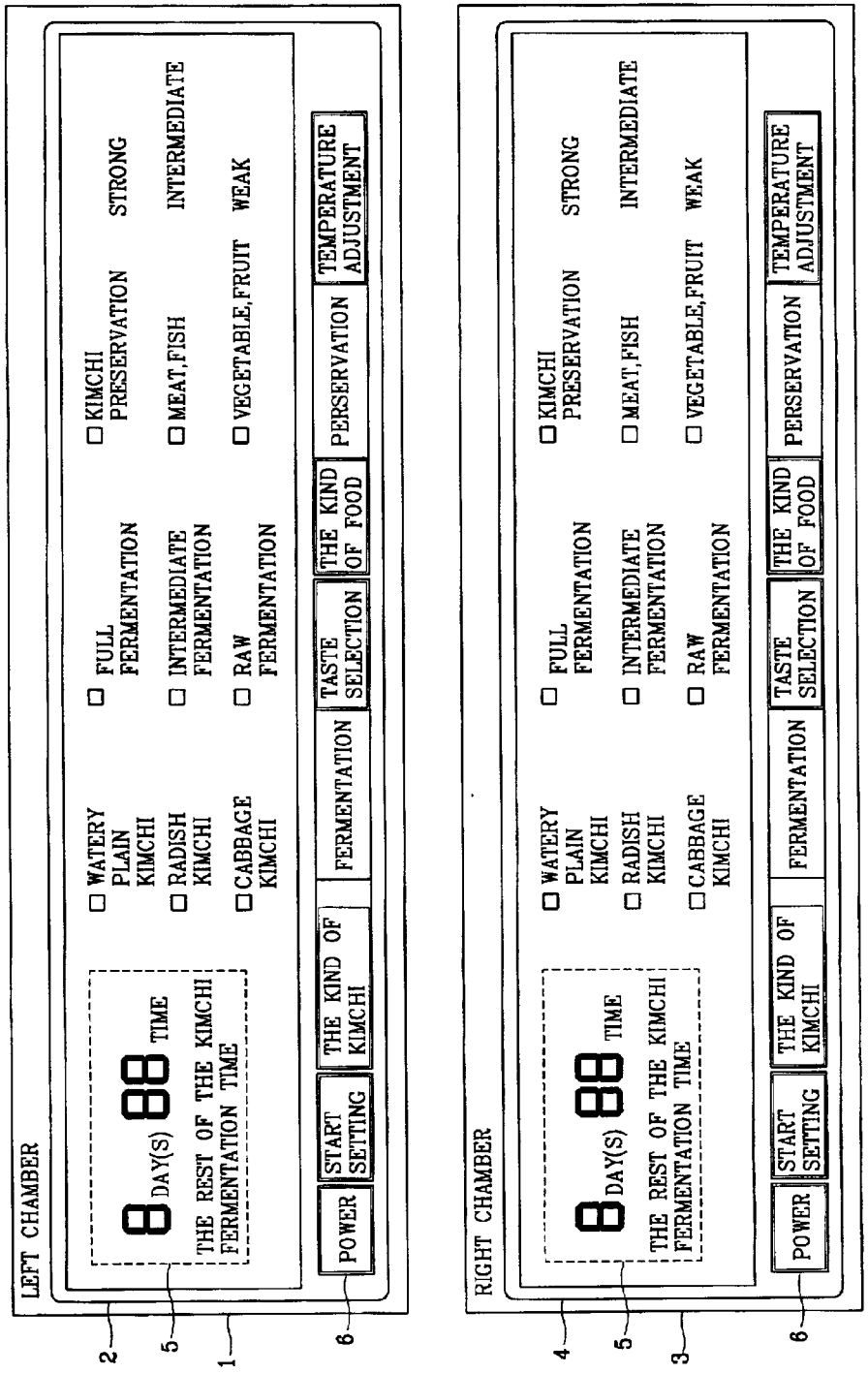
FIG. 1 illustrates a display unit of a kimchi refrigerator in accordance with the conventional art.
Figure 2:
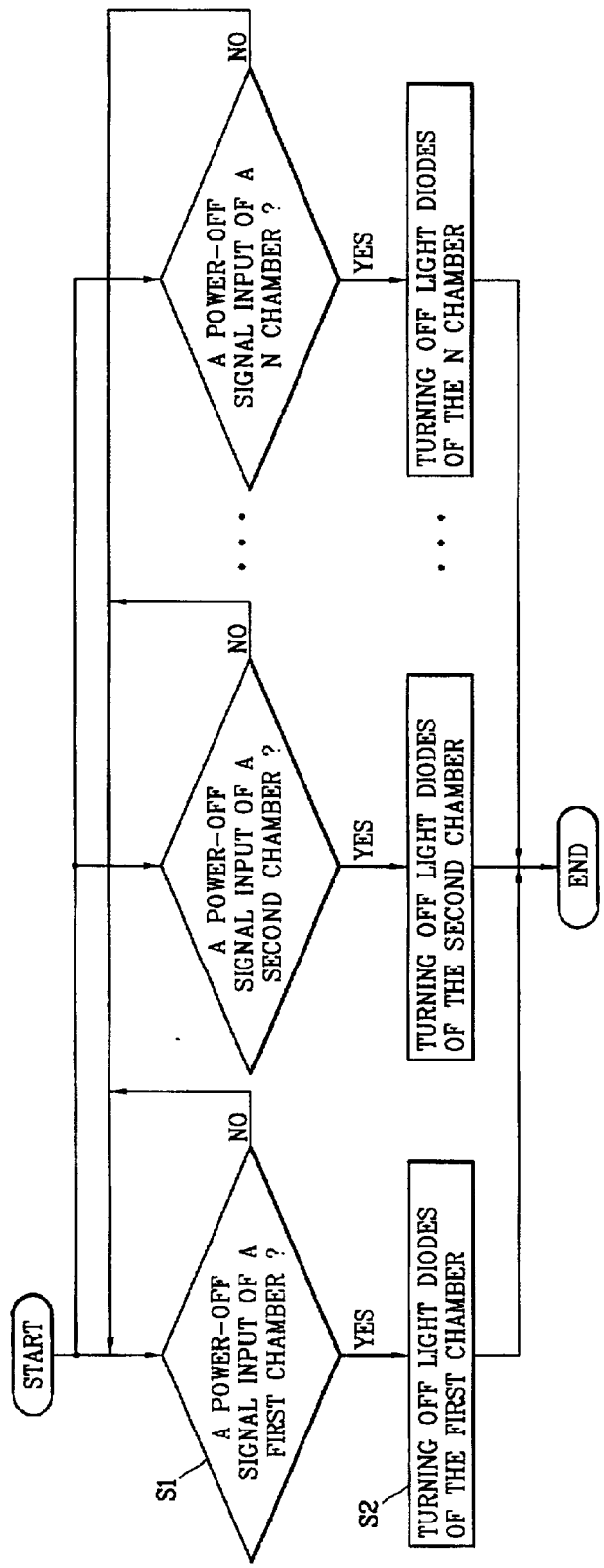
FIG. 2 is a flow chart illustrating a power-off method of a kimchi refrigerator in accordance with the conventional art.

First, the signal generating unit 31 judges whether the user turns off power of each of the first~the N chambers. For example, when the user chooses (pushes) a power-on/off button (reference numeral 6 in FIG. 1) installed at a certain side of the first chamber, the signal generating unit 31 generates a power-off signal. Herein, it is preferable to set the certain time as three seconds. In more detail, when the user turns off power of the first chamber by pushing a pertinent the power-on/off button for three seconds, the power-off signal is generated, and accordingly contents of the first chamber can be kept stably as shown at step S11.

The control unit 32 receives the power-off signal from the signal generating unit 31 and outputs the power-off signal to the display unit 33 installed at the certain side of the first chamber. When the power-off signal is not inputted from the signal generating unit 31, the control unit 32 outputs the control signal to the display unit 33. Herein, the control unit 32 continually checks a power-off signal input in order to judge whether power of other chambers (the second~the N chamber) are turned off by the user.

After that, the display unit 33 receives the power-off signal outputted from the control unit 32 and displays the power-off state of the first chamber. Herein, a liquid crystal display and a plasma display panel, etc. can be used as the display unit 33. In addition, it is preferable to minimize waste of parts by displaying the power-off state through a 7-segment display displaying the preset kimchi fermentation time, rather than additionally installing the display unit 33 at the certain side of the chamber. Hereinafter, the display unit 33 displaying the power-off state will be described in more detail with reference to accompanying FIG. 5. FIG. 5 illustrates a display unit, which displays a power-off state, of the power-off state display apparatus of the kimchi refrigerator in FIG. 3.

Figure 5:
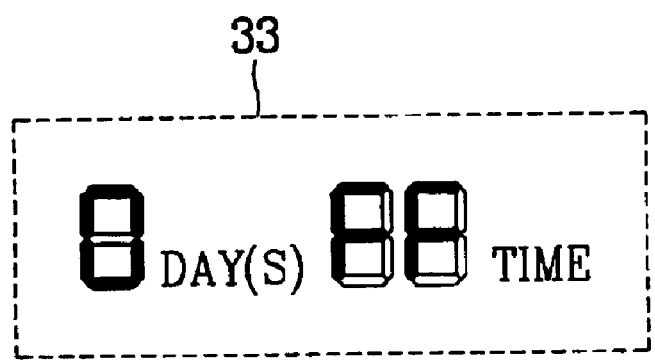
FIG. 5 illustrates a display unit, which displays a power-off state, of the power-off state display apparatus of the kimchi refrigerator in FIG. 3.

As depicted in FIG. 5, in the present invention, without additionally installing the display unit 33 to the refrigerator in order to display a power-off state, the 7-segment display, which is installed to the kimchi refrigerator and displays a kimchi fermentation time, displays a power-off state of each chamber (the first~the N chambers). In more detail, the 7-segment display displays "OFF" characters after receiving the power-off signal or display the kimchi fermentation time after receiving the control signal.

In the meantime, with the exception of the display unit 33 displaying the power-off state of the first refrigerator, each display unit of the rest of the chambers (the second~the N chamber) are off. In more detail, the display units respectively installed at the front surface of the chambers (the second~the N chamber) indicate an operation state by displaying a normal function (the kimchi fermentation time) as shown at step S13.

As described above, in a power-off state display apparatus of a refrigerator and a method thereof in accordance with the present invention, when a user turns off power of a certain chamber, because a power-off state of a pertinent chamber is displayed, the user can accurately recognize each operation state of plural chambers installed to a refrigerator.

In addition, in a power-off state display apparatus of a refrigerator and a method thereof in accordance with the present invention, when a display unit (7-segment display unit) is off due to its failure or a refrigerator's failure, because a power-off state of a pertinent chamber is displayed, a user can quickly recognize the failure.

In addition, in the present invention, because a user can quickly recognize a failure, it is possible to improve a usability of a refrigerator.

In addition, in the present invention, because a power-off signal is generated only when a user pushes a power button of a certain chamber for three seconds, it is possible to prevent power-off errors due to a user's mistake or button handling greenness.

In addition, in the present invention, by preventing power-off errors of a certain chamber due to a user's mistake or button handling greenness, contents of a pertinent chamber can be safely preserved.

In addition, in the present invention, when a user turns off power of a certain chamber, a 7-segment display, which is installed to the kimchi refrigerator to display a kimchi fermentation time, displays "OFF" characters, and accordingly waste of parts due to additional functions can be minimized.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A power-off state display apparatus for a refrigerator, comprising:
   a signal generating unit configured to generate a power-off signal at least one of a plurality of chambers of the refrigerator is turned off; and
   a display unit configured to receive the power off signal and to display a corresponding power-off state indicator.

2. The apparatus of claim 1, further comprising:
   a control unit configured to output the power-off signal or a control signal to display a preset kimchi fermentation time.

3. The apparatus of claim 2, wherein the control unit is configured to output only the power-off signal to the display unit when the power-off signal is input, and to output only the control signal to the display unit when the power-off signal is not input.

4. The apparatus of claim 2, wherein the display unit is configured to display the power-off state indicator after receiving the power-off signal, and to display the preset kimchi fermentation time after receiving the control signal.

5. The apparatus of claim 1, wherein the signal generating unit is configured to generate the power-off signal when a power button configured to turn off power of a chamber of the plurality of chambers is depressed for a predetermined time.

6. The apparatus of claim 5, wherein the predetermined time is three seconds.

7. The apparatus of claim 1, wherein the display unit comprises a plurality of light emitting diodes.

8. The apparatus of claim 1, wherein the display unit comprises a 7-segment display.

9. The apparatus of claim 1, wherein the display unit is configured to display "OFF" characters after receiving the power-off signal.

10. A power-off state display apparatus for a refrigerator, comprising:

a signal generating unit for generating a power-off signal to display a power-off state of a pertinent chamber of the refrigerator when a user turns off power of at least one of a plurality of chambers installed in the refrigerator;

a control unit for outputting the power-off signal or a control signal to display a preset kimchi fermentation time; and a display unit for displaying a power-off state by receiving the power-off signal, or for displaying the preset kimchi fermentation time by receiving the control signal.

11. The apparatus of claim 10, wherein the signal generating unit generates the power-off signal when the user pushes a power button for turning off power of a pertinent chamber for a certain time.

12. The apparatus of claim 11, wherein the certain time is three seconds.

13. The apparatus of claim 10, wherein the control unit outputs only a power-off signal to the display unit when the power-off signal is inputted, or outputs only the control signal to the display unit when the power-off signal is not inputted.

14. The apparatus of claim 10, wherein the display unit consists of light emitting diodes.

15. The apparatus of claim 10, wherein the display unit is a 7-segment display.

16. The apparatus of claim 10, wherein the display unit displays "OFF" characters after receiving the power-off signal.

17. A power-off state display method of a refrigerator, comprising:

generating a power-off signal to display a power-off state indicator of a pertinent chamber of the refrigerator when power of at least one of a plurality of chambers of refrigerator is off; and displaying the power-off state indicator of a display unit after receiving the power-off signal.

18. The method of claim 17, further comprising displaying a preset kimchi fermentation time on a display unit of a corresponding chamber of the plurality of chambers when the corresponding chamber is in a power-on state.

19. The method of claim 17, wherein generating the power-off signal further comprises depressing a power button of at least one of the plurality of chambers for three seconds.

20. The method of claim 17, wherein displaying the power off state indicator further comprises displaying "OFF" characters on the display unit.

21. The method of claim 20, wherein the display unit comprises a 7-segment display.

* * * * *